Aug. 2, 1966  C. R. LISTER  3,263,734
FREIGHT CAR GRAIN DOOR
Filed Aug. 17, 1964  4 Sheets-Sheet 1
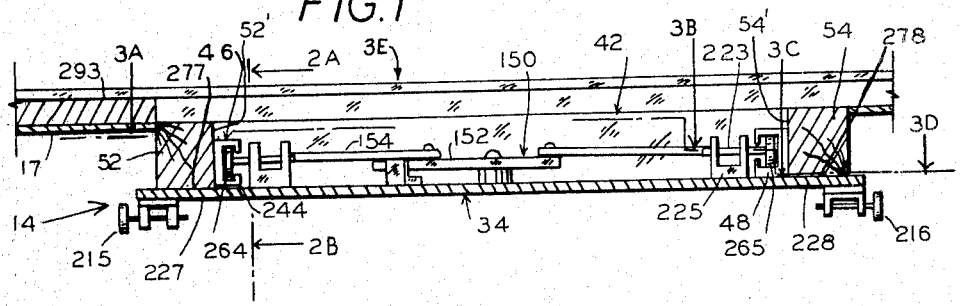
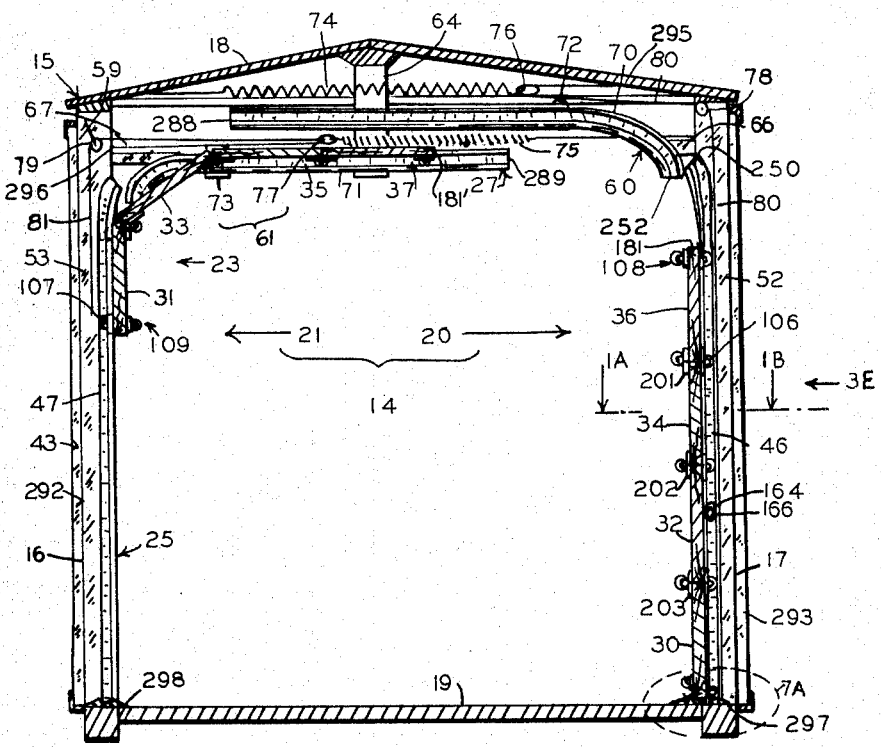
CHARLES R. LISTER
INVENTOR.
BY Ely Silverman
ATTORNEY Aug. 2, 1966  C. R. LISTER  3,263,734
FREIGHT CAR GRAIN DOOR
Filed Aug. 17, 1964  4 Sheets-Sheet 2
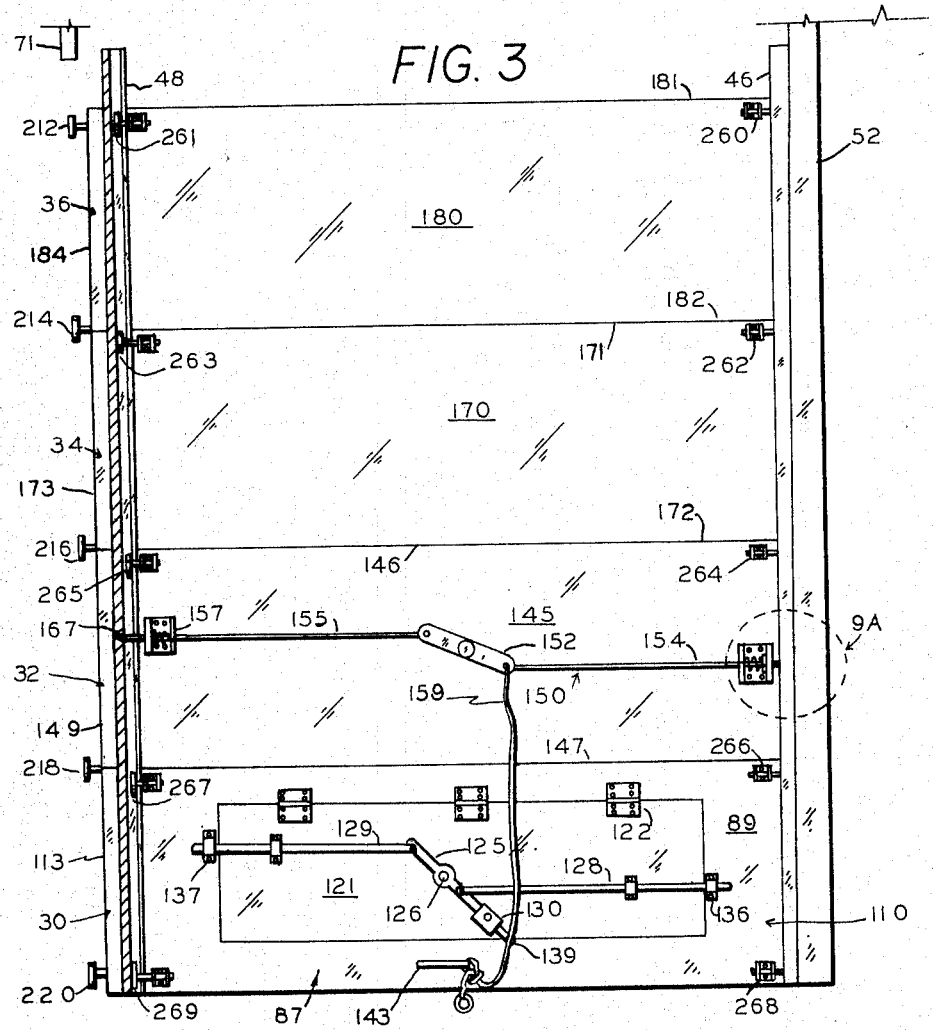
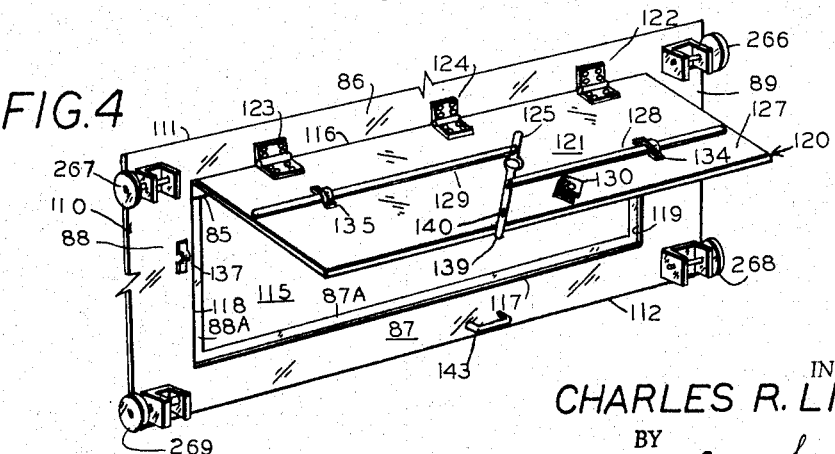
INVENTOR.
CHARLES R. LISTER
BY
Ely Silverman
ATTORNEY

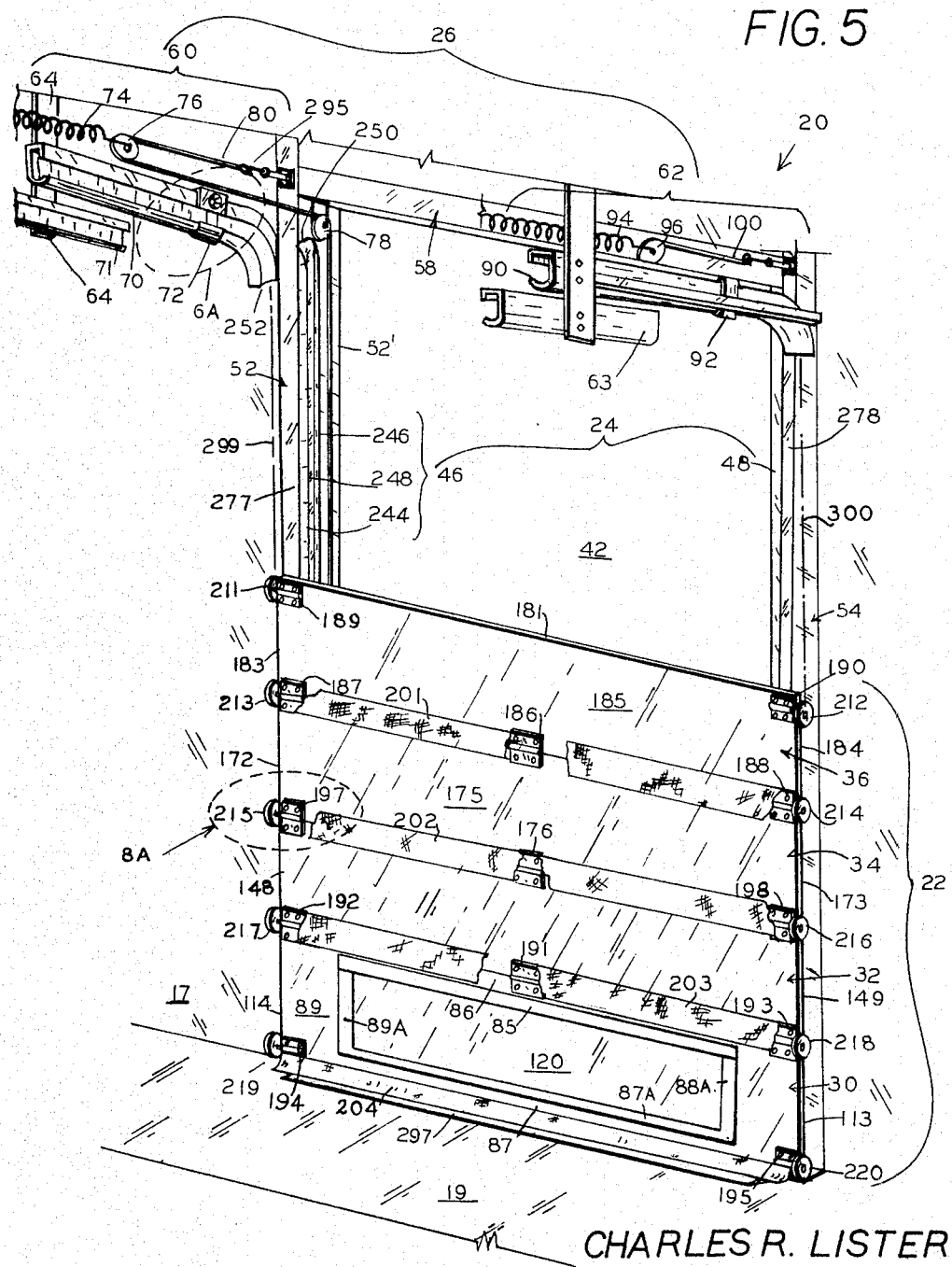

Aug. 2, 1966     C. R. LISTER     3,263,734
FREIGHT CAR GRAIN DOOR
Filed Aug. 17, 1964     4 Sheets-Sheet 4

CHARLES R. LISTER
INVENTOR.

BY Ely Silverman
ATTORNEY

United States Patent Office 3,263,734
Patented August 2, 1966

1

3,263,734
FREIGHT CAR GRAIN DOOR
Charles R. Lister, 4405 Cline Road, Amarillo, Tex.
Filed Aug. 17, 1964, Ser. No. 389,939
7 Claims. (Cl. 160—113)

This invention relates to a new and useful improvement in freight cars. It comprises an improved double overhead roller type grain retaining door. This door is a permanent fixture in the freight car; the cars with such doors may also be used to transport commodities other than grain. This door prevents grain loss and minimizes labor time and cost while loading and unloading the car and minimizes grain loss while transporting the grain in cars equipped with such doors. It is particularly adapted for railroad freight train cars.

One object of this invention is to provide a permanently attached grain door which utilizes the weight of the grain to help provide for a firm seal at the door space edges.

Another object of this invention is to provide a grain door for a freight car with an improved trap door therein to facilitate the unloading of the car.

Yet another object of this invention is to provide an improved automatically sealed door structure movable to a position in the car permitting other commodities to be transported in the car with a minimum head space loss.

These and other objects of this invention will be apparent to those skilled in the art upon the study of the below specification and drawings, which drawings form a part of the specification and wherein the same number refers to the same part throughout:

FIGURE 1 is a diagrammatic transverse longitudinal horizontal cross sectional view along plane 1A–1B of FIGURE 2;

FIGURE 2 is a vertical transverse section view along plane 2A–2B of FIGURE 1;

FIGURE 3 is a view along section 3A–3B–3C–3D of FIGURE 1 looking inward of the car as along the direction of the arrow 3E of FIGURE 1 and FIGURE 2 showing the outer surface of and apparatus on a movable door portion of one door subassembly of this invention in its closed position;

FIGURE 4 is a perspective view of the trap door panel section in its open position;

FIGURE 5 is an overall interior perspective view of one side of the apparatus of this invention;

Figure 6:
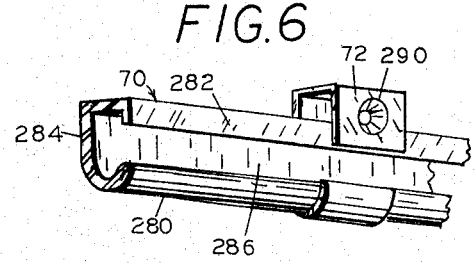
FIGURE 6 is an enlarged detail showing zone 6A of FIGURE 5.
Figure 8:
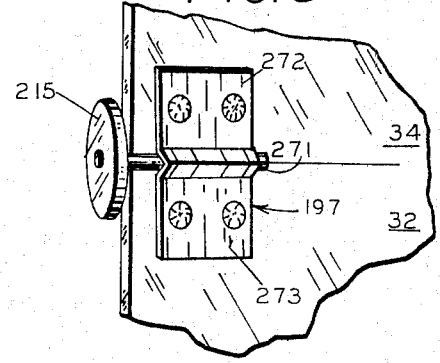
FIGURE 8 is an enlarged view of zone 8A of FIGURE 5 showing detail of an interior hinge and the roller thereof.
Figure 7:
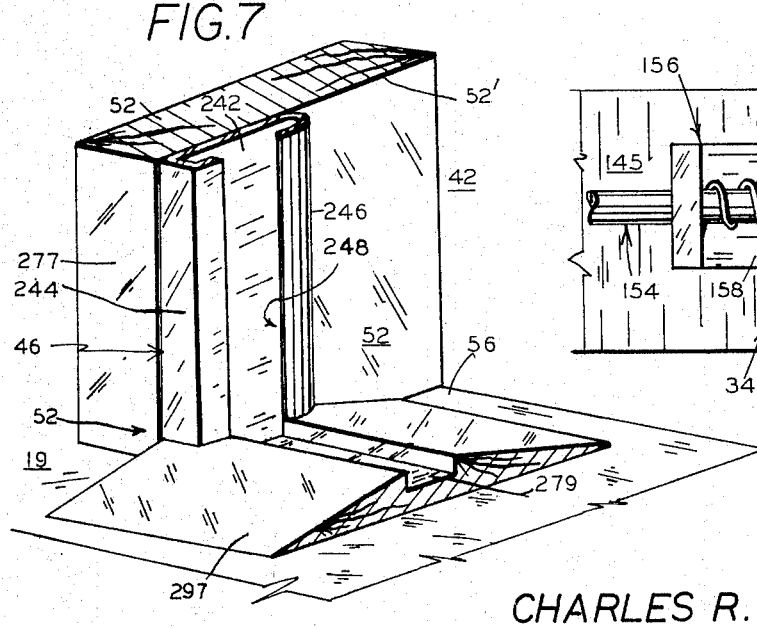
FIGURE 7 is an enlarged perspective view of zone 7A of FIGURE 2 when the door 22 is raised.
Figure 9:
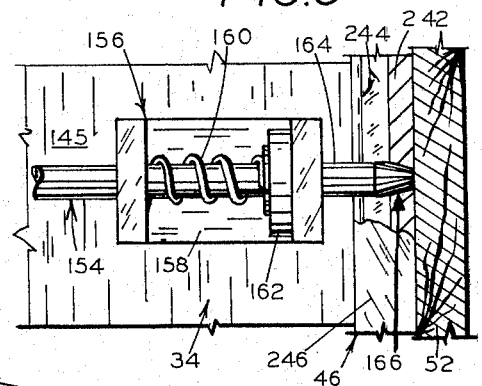
FIGURE 9 is an enlarged view of zone 9A of FIGURE 3.

The preferred embodiment of the apparatus of this invention is generally shown as 14 in the drawings and in the preferred embodiment is intended for use in a conventional railroad freight box car 15. The box car comprises a conventional longitudinally extending left vertical wall 16, right wall 17, a ceiling and roof 18, and a floor 19. The left wall has a door opening 43 and the right wall has a door opening 42 each outlined by a frame therefor and firmly attached to or integral with the frame of the car which frame of the car is firmly attached to and supports the ceiling or roof 18.

The apparatus 14 comprises a right hand assembly 20 and a left hand assembly 21. The right hand assembly 20 comprises a movable right hand hinged panel subassembly 22, a lower vertical right hand track subassembly 24 and an upper transverse right hand track subassembly 26. The left hand assembly 21 comprises a movable left hand hinged panel subassembly 23, a lower vertical left hand track subassembly 25 and an upper transverse left hand track subassembly 27.

The panel subassembly 22 comprises a lower, rigid trap door panel 30, a locking panel 32 thereabove and hingedly attached thereto, an intermediate panel 34 above the locking panel 32 and hingedly attached thereto and a top panel 36 hingedly attached to the top of intermediate panel 34. Subassembly 22 also comprises a set of exterior guide rollers 106 and a set of interior guide rollers 108. Subassembly 23 also comprises a set of exterior guide rollers 107 and a set of interior guide rollers 109.

The lower vertical track subassembly 24 comprises a front right hand vertical track 46 and a rear right hand vertical track 48. The front track 46 is firmly attached to the front edge 52′ of the conventional door opening 42 in wall 17 and the rear track is attached to the rear edge 54′ of the door opening 42. Tracks 46 and 48 each extend from the bottom 56 of the right hand door opening 42 which bottom is co-planar with the floor 19, substantially but not entirely to the top of the right hand door opening 42.

The panel subassembly 23 comprises a lower trap door panel 31, a locking panel 33 thereabove and hingedly attached thereto an intermediate panel 35 above the locking panel 33 and hingedly attached thereto a top panel 37 hingedly attached to the top of panel 35. The lower vertical track subassembly 25 comprises a front left hand vertical track 47 and a rear left hand vertical track (not shown) similar to 48. The front track 47 is firmly attached to the front edge of the conventional door opening 43 in wall 17 and the rear track is attached to the rear edge of the door opening 43. The tracks of subassembly 25 each extend from the bottom of the left door opening 43, which bottom is co-planar with the floor 19 substantially but not entirely to the top of the left hand door opening 43.

The right upper transverse track subassembly 26 comprises a right front upper track subassembly 60 and a right rear upper track subassembly 62. The front right upper track subassembly 60 and the rear upper track subassembly 62 are mirror images of each other and at the same level. The front right upper track subassembly 60 is firmly attached to and supported by a central brace, 64, and a lateral end brace, 66, on the frame of the car 15 near the ceiling thereof. Subassembly 62 is similarly attached and supported. The front right upper track subassembly 60 is spaced slightly forward of the front frame of the right door entrance and firmly attached thereto; the right rear upper track subassembly 62 is spaced slightly to the rear of the rear frame 54 of the right door entrance and firmly attached thereto.

The left upper transverse sub-assembly 27 comprises a left front upper track subassembly 61 and a left rear upper track subassembly 63. The front left upper track subassembly 61 and the rear upper track subassembly 63 are mirror images of each other and at the same level. The front left upper track subassembly 61 is firmly attached to and supported by a central brace 64 and a lateral brace 67 on the frame of the car 15 near the ceiling thereof and, as below described, below the level of the subassembly 60 while subassembly 63 is correspondingly below subassembly 62. The front left upper track subassembly 61 is spaced slightly forward of the front frame of the left door opening and firmly attached thereto; the left rear upper track subassembly 63 is spaced slightly to the rear of the rear frame of the left door entrance and firmly attached thereto. Subassembly 63 is supported firmly in the manner of support of subassembly 61.

Track subassembly 60 comprises a right front transverse track 70, a safety latch 72, a spring 74, a central sheave 76, a lateral sheave 78, and a front spring cable 80. The front track 70 is supported on a lateral end brace 66 located slightly forward of the front edge or framing 52 of opening 42. The end brace is supported on the frame of wall 17 and on a center brace 64 which extends along the length of car 15.

The rear right track subassembly 62 comprises a rear transverse track 90; a safety latch 92, a spring 94, a center sheave 96, a lateral sheave, and a rear spring cable 100. The rear horizontal track is supported on a rear end brace and on a rear center brace similar to braces 66 and 64. The exterior set of rollers 106 of the subassembly 22 easily fits into the tracks 46 and 48 of the subassembly 24 in the lower position of subassembly 22. The interior guide rollers 108 of the subassembly 22 easily fit into tracks 70 and 90 of the subassembly 26 in the raised position of the subassembly 22.

The exterior set of rollers 107 of the subassembly 23 easily fit into the vertical tracks as 47 of the subassembly 25 in the lower position of subassembly 23. The interior guide rollers 109 of the subassembly 23 easily fit into the tracks as 71 of the upper track subassembly 27 in the raised position of the subassembly 23.

Accordingly, the subassembly 23 is a mirror image of the subassembly 22 and is interchangeable therewith, while the subassemblies 25 and 27 are similar to but not mirror images of the subassemblies 24 and 26 due to differences in heights of the upper portions thereof.

Track subassembly 61 comprises a front transverse track 71, safety latch 73, a spring 75, a central sheave 77, a lateral sheave 79 and a cable 81. The front transverse track 71 is supported on a front center brace 64 and on a lateral end brace firmly supported on the frame of car 15. Track 71 is located forward of the rear edge of the front frame member 53 for opening 43 and the end brace for track 71 is firmly attached to the front of that frame member 53.

The rear left track subassembly 63 is a mirror image of front left subassembly 61 in the same manner subassembly 62 is a mirror image of subassembly 60.

The trap door panel 30 comprises a rigid peripheral frame 110 and a trap door panel subassembly 120 hingedly supported thereon for outward pivotal motion thereabout and a seal between those subassemblies.

The frame 110 comprises an upper imperforate edge panel 86 with an upper edge 111, a lower edge panel 87 with a lower edge 112, a rear edge panel 88 with a vertical rear edge 113 and a front edge panel 89 with a vertical front edge 114. The panels 86, 87, 88, and 89 of the frame 110 are imperforate and outline an orifice 115. The orifice has a top edge 116, a bottom edge 117, a rear edge 118 and a front edge 119. Metal strips 87A, 88A, and 89A are flexible and extend into orifice 115 from panels 87, 88, and 89, respectively, and, in the closed position of panel 121, form a seal therewith over edges 117, 118 and 119 respectively.

A strip 85 of a flexible sheet of plastic fiber webbing unaffected by common solvents, weak alkalies and acid, tough, resilient and resistant to abrasion, strong and durable having a high tensile strength (as 13,000 p.s.i.) and a high compressive strength (such as 11,000 p.s.i.) and a high continuous heat resistance (such as 290° F.) and good dielectric properties as well as the property of self-extinguishing flame such as the polyamide resins sold under the name of Nylon 66 and polycaprolactam is attached to the bottom of panel 86: it extends into orifice 115 and, when panel 121 is closed, forms a seal therewith over edge 116. An upper pair of front and rear outer rollers 266 and 267, respectively, and a lower pair of front and rear outer rollers 268 and 269, respectively, are rotatably yet firmly attached to the outer surface of frame 110 and an upper pair of front and rear interior rollers 217 and 218 respectively and lower pair of front and rear interior rollers 219 and 220 are supported on the interior surface of frame 110. Each upper pair of inner front and rear rollers has the same longitudinal axis of rotation; each lower pair of inner front and rear rollers has the same longitudinal axis of rotation; each upper pair of outer front and rear rollers has the same longitudinal axis of rotation; each lower pair of outer front and rear rollers has the same longitudinal axis of rotation.

Portions of the trap door latching subassembly are also attached to the outer surface of panels 88 and 89.

The trap door subassembly 120 comprises a trap door panel 121, and a trap door panel locking subassembly therefor. The components of the locking subassembly are pivotally and slidably yet firmly attached to panel 121 and serve to latch it on to frame 110. Trap door panel 121 is a rigid imperforate rectangular panel; it is hingedly attached by hinges 122, 123 and 124 at its front and rear and center respectively at the top edge thereof to panel 86; panel 121 meets and covers the trap door orifice 115. The trap door locking subassembly comprises a trap door panel locking handle 125, front and rear trap door locking arms 128 and 129, a handle latch 130, front and rear trap door locking arm support brackets 134 and 135 and, on frame 110 front and rear trap door panel latches 136 and 137. The trap door locking subassembly provides for opening of the trap door 120 from the outside and for closing it as desired.

Handle 125 is rigid and is pivotally attached at a pivotal support 126 to the outside surface 127 of the door panel 121. The rigid handle 125 is provided with a rigid upper arm and a rigid lower arm. The upper arm of the handle is pivotally attached through a pivot pin to a rigid rear panel locking arm or bar 129 which is moved thereby through a support bracket 135 on panel 121 to reciprocate forward and backward along the length of the trap door to engage a latching bracket 137 on panel 88 to the rear of the rear edge of the orifice 115. Extension 139 controls subassembly 150. The lower arm of handle 125 is pivotally attached by a pivot pin to a movable rigid forward locking arm or bar 128 which is slidably supported in a bracket 134 on panel 121 to engage with a latching bracket 136. Latching bracket 136 is firmly supported on panel 89 forward of the front edge 119 of the orifice 115. The lower arm of handle 125 has an extension, 139, with a hole 140 therein. The hole 140 matches a hole in latch 130. Latch 130 is located to receive and hold handle 125. The holes in latch 130 and handle 125 permit them to be held together by a conventional padlock. Latch 130 is fixedly attached to the front surface of the panel 121. It engages and holds handle 125 in position as shown in FIGURE 3 for fixed engagement of the arms 128 and 129 in locking relationships with the brackets 136 and 137 to keep door 120 closed. A handle 143 is firmly attached to the bottom portion of the panel 87.

The bottom edge of the panel 32 is joined to the top edge of panel 30 on the interior surfaces of those panels by central hinge 191, front hinge 192 and rear hinge 193.

The right locking panel 32 supports a movable door locking subassembly 150 on its outer surface 145, as well as a pair of outer rollers 264 and 265 and supports therefor near its front and rear ends, respectively.

The panel 32 has a top edge 146, a bottom edge 147, a front edge 148 and a rear edge 149. The locking panel 32 supports a pair of inner rollers 215 and 216 and supports therefor near its front and rear ends, respectively. The outer rollers have a common longitudinal axis of rotation and the inner rollers have a common longitudinal axis of rotation.

The door locking subassembly 150 comprises a rotatable door control arm 152, front and rear latch bars 154 and 155 pivotally connected thereto, and front and rear latch bar support and spring loading subassemblies 156 and 157. Subassemblies 156 and 157 are mirror images of each other structurally. The front latch subassembly 156 comprises a U-shaped bracket 158 wherein there is located a compressed spring 160 which bears against an enlarged shoulder 162 of the arm, as 154 which passes through said bracket and urges the forward end 164 of the latch bar 154 forward into latching engagement with the right door front latching hole 166 in front right vertical track 46 or the latching hole 290 in the safety latch 72 on right front transverse track 70.

The rear right latch subassembly 157 comprises a U-shaped bracket 159 wherein there is located a compressed spring which bears against an enlarged shoulder of the arm, as 155, which passes through said bracket and urges the rear end of the latch bar 155 into latching engagement with the right rear door latching hole in the rear right vertical track 48 or a latching hole in the safety latch 92 in the right transverse track 90.

The right intermediate door panel 34 is a flat rigid imperforate sheet; it comprises an upper edge 170, a lower edge 171, a front edge 172 and a rear edge 173. The front edge 172 is vertical and in line with the vertical front edges 148, 114 and 183 of panels 32, 30 and 36, respectively. The rear edge 173 is vertical and in line with the vertical rear edges 149, 184 and 113 of panels 32, 36 and 30, respectively. At its lower edge 171 the panel 34 is hingedly joined to the upper edge 146 of the panel 32. A central hinge 176, a front hinge 197 and a rear hinge 198 join the lower edge 172 to the upper edge 146 of the panel 32. The hinges 176, 197 and 198 are attached to the interior surfaces of each of the panels 34 and 32. Panel 34 supports on its outer surface 170 a pair of a front and rear outer rollers 262 and 263 and supports therefor near to but spaced inwardly of its front and rear edges respectively. The outer rollers have a common longitudinal axis of rotation. The panel 34 also supports on its inner surface 175 at its front and rear ends respectively, a pair of inner rollers 213 and 214 and the supports therefor. These inner rollers have a common longitudinal axis of rotation.

Top panel 36 is an imperforate rigid panel with an outer surface 180 and an inner surface 185. The top panel 36 has a top edge 181, a bottom edge 182, a front edge 183, and a rear edge 184. The bottom edge 182 of panel 36 is hingedly attached to the top edge 171 of the panel 34 by a center hinge 186, a front hinge 187, and a rear hinge 188. The hinges are attached to the interior surfaces of those panels.

Panel 36 firmly yet rotatably supports on its outer surface 180 a pair of front and rear outer rollers 260 and 261 respectively and supports therefor near to but spaced inwardly of its front and rear edges respectively. These outer rollers have a common longitudinal axis of rotation. Panel 36 also supports on its inner surface 185 at its front and rear ends respectively a pair of inner rollers 189 and 190 and supports therefor. These inner rollers have a common longitudinal axis of rotation.

Each of the interior rollers as 213 through 218 are identical in size and shape and each is supported on a shaft, as 271 for roller 215, which shaft passes through and joins the eyes of each of the hinge plates 272 and 273 of a common double leaf hinge as 197. The upper hinge plate is joined to the upper of the thereby hingedly joined panels as 34 and the lower plate is joined to the lower of such panels, as 32. The axes of rotation of each of the front and rear rollers at the same height, as 215 and 216, are about the axis of the shafts therefor and are on the same longitudinal axis; that axis passes parallel to and at the same height as the top edge of the lower panel to which the hinge supporting the rollers is attached and through the eyes of the plates of the central hinge 176 therebetween. Hinges 187, 188, 197, 198, 192 and 193 are of the identical structure and have the same relations as does hinge 197 between their hinge plates, the rollers supported thereby (as 213, 214, 215, 216, 217 and 218, respectively), the panels connected by said hinges and the central hinges 186 and 191 connected to those panels.

The rollers 211, 212, 219 and 220 are identical and are supported on identical hinges 189, 190, 194 and 195 respectively: these hinges are identical in structure to hinges 187, 188, 197, 198, 192 and 193: the relations of rollers 211 and 212 and of 219 and 220 to each other are the same for rollers 215 and 216 except that both plates of hinges 189 and 190 are attached to panel 36 below the top edge thereof and both plates of hinges 194 and 195 are attached to panel 30 above the bottom edge of panel 30.

The upper rollers on the outer surface of each panel as 30, 32, 34, and 36 of subassembly 22 (and 23) are all, in the position shown in FIGURES 3 and 5, except for the lowermost outer rollers, the same distance below the rollers shown generally at the same level (e.g. 265 and 216) on the inner surface of that panel. All the interior rollers 211, 213, 215, 217 and 219 are equi-spaced from each other and rollers 212, 214, 216, 218 and 220 are correspondingly spaced, although the axes of rotation of the lowest rollers 219 and 220 are spaced above the bottom edge 112 of panel 30 by about 2 inches as is the axes of rotation of the lowermost of the outer rollers (268 and 269) attached to the lowest panel 30. The axes of rotation of rollers 211 through 220 are all parallel to each other. The planes of rotation of rollers 211, 213, 215 and 217 are located in one, first, vertical plane and the rollers 212, 214, 216, 218 and 220 are located in a second vertical plane parallel to that first vertical plane.

The front rollers 211, 213, 215, 217 and 219 engage and roll in the front right transverse track 70 and the rear rollers 212, 214, 216, 218 and 220 engage and roll in the rear right transverse track as 90 when the movable subassembly 22 is in its upper or transverse (generally horizontal) position. The front rollers similarly attached to the interior surface of components of subassembly 23 engage and roll in the left track 71 and the rear rollers similarly attached to the interior surface of the components of subassembly 23 at their rear similarly engage and roll in the rear left transverse track when the movable subassembly 23 is in its upper position. FIGURE 1 shows the subassembly 23 moved toward but not completely in its upper position.

On the outer surface of subassembly 22, as seen in FIGURES 2 and 3, at the upper edge of each of panels 30, 32, 34 and 36 and inwardly spaced away from the front and rear edges of each of the panels 30, 32, 34 and 36 and firmly attached thereto are a series of front outer rollers 260, 262, 264 and 268 and a series of rear outer rollers 261, 263, 265, 267 and 269 for engagement with the vertical tracks attached to the front and rear door frame members 52 and 54, respectively. All of these rollers are identical in size and shape. Each roller, as 265, is firmly attached to and supported on a shaft as 223; the shaft is firmly yet rotatably supported in co-axial circular holes in the arms of a U-shaped bracket as 225; the bracket is firmly attached to the front surface of the panel, as 34, with the top edge of the bracket 225 at the level of the upper edge of the panel for panels 30, 32, 34 and 36. Panel 30 is also provided with a lower front roller 268 and a lower rear roller 269, the supporting brackets for which have their lower edges at one inch above the lower edge 112 thereof.

The rear exterior rollers as 261, 263, 265, 267 and 269 for each of subassemblies 22 and 23 are spaced forward and away from the rear edge (as 184, 173, 149 and 113) of the panels as 30, 32, 34, and 36 thereof: these rear edges form a straight vertical line in the lowered position thereof as shown for subassembly 22 in FIGURE 5: the rear exterior rollers are spaced away from these rear edges by a distance slightly larger than the front to rear distance across the frame member 54, as is shown in FIGURE 1.

The front exterior rollers as 260, 262, 264, 266 and 268 for each of subassemblies 22 and 23 are spaced rearwards and away from the front edges of panels as 30, 32, 34 and 36 thereof (which front edges form a straight vertical line in the lowered position thereof as shown for subassembly 22 in FIGURE 5) by a distance slightly larger than the front to rear distance across the frame member 52, as shown in FIGURE 1.

The lower right vertical track subassembly 24 of the car 15 comprises a front right vertical track 46 and a rear right vertical track 48. Track 46 is firmly attached to the rear of the front right door frame vertical member 52 and track 48 is firmly attached to the front of the right rear door frame vertical member 54. Each track as 46 is C-shaped and comprises a vertical end member 242, an inner lip as 244 and an outer lip 246 joined to member 242 and a slot 248 between the free ends of members 244 and 246. The groove 248 is such a size as to freely accommodate the shaft for each of the rollers 260, 262, 264, 266 and 268. The track 48 is a mirror image of track 46 and similarly freely accommodates the shafts for the rollers 261, 263, 265, 267 and 269. The track 46 extends upward to about six inches of the top of the door frame and there is expanded inwardly of the car 15 and forms upper vertical track opening 250.

In the closed or lowered position of subassembly 22, rollers 260, 262, 264, 266 and 268 engage in the right front vertical track 46 and rollers 261, 263, 265, 267 and 269 engage in the right rear vertical track 48. The slots as 248 in track 46 are larger than the roller shaft diameter, but smaller than the diameter of the rollers and so hold the rollers and subassemblies as 22 in place. These rollers have a loose fit in the tracks and do not bear weight during grain transport. The pressure of the grain on the interior surface of the subassemblies as 22 forces the portions as 227 and 228 of the door panels adjacent to the door frame against the door frame members as 52 and 54 and forms a firm seal therebetween. This seal is adequate to prevent escape of grain therebetween notwithstanding the usual vibrations of such grain cars during transport of grain over conventional railroad tracks.

The adjacent edges as 171 and 182, 172 and 146, and 147 and 116 of the panels as 30, 32, 34 and 36 in the vertical position of subassemblies 22 and 23 form a close fit. Additionally, strips 201, 202, and 203 and 204 of plastic webbing of the same characteristics as webbing 85, are used to seal the spaced between neighboring panel edges and between edges 112 and floor 19 against the passage of grain therethrough. Strips 201, 202 and 203 are made of the same material as seal strip 85 and are attached to the interior surface of the panels of subassembly 22. Each strip 201, 202, 203 extends from 1 inch above the bottom edges of panels 36, 34 and 32 to 1 inch below the top edge of the panel therebelow and a similar strip 204 attached to the bottom of panel 87, these strips are each firmly attached to the interior surface of the said upper panel for its entire length and provide further assurance of a grain tight seal between the panels: the seal is held in place by the weight of the granular material carried in the car 15 between the subassemblies 22 and 23. Strips 201 through 204 are shown broken away in FIGURE 5 to more clearly show the relationship between the various panels and hinges.

The front right transverse track 70 is rigid, strong and C-shaped in transverse section. It has a lower lip 280, an upper lip 282 and a central plate 284 all firmly joined together. A slot 286 is located between the free edges of lips 280 and 282. The space enclosed within the lips of the track 70 freely houses the rollers 211, 213, 215, 217 and 219 in the upper position of subassembly 22. The slot 286 accommodates the shaft for these rollers but is narrower than the diameter of the rollers. Accordingly the rollers are firmly located in the track. The lateral end of track 70 curves downward to a downwardly directed opening 252 which is at a vertical level slightly below the vertical level of opening 250.

The rear transverse track 90 is a mirror image of track 70. It has a slot to accommodate the shafts for each of the rollers 212, 214, 216, 218, and 220 and the space within track 90 houses those rollers in the upper position of subassembly 22.

The lateral end of track 90 opens downward at an opening which is slightly below the level of the top of member 48; that opening is directly in the upward vertical paths of the rollers 212, 214, 216, 218 and 220 from their lowered position as shown in FIGURE 5 and opening 252 is similarly directly in the upward paths of rollers 211, 213, 215, 217 and 219 when subassembly 22 is moved upwards in subassembly 24. This is because the distance measured transversely of the length of car 15 from the center of slot 248 to the center of slot 286 at the vertical level of opening 252 is the same as the distance, measured transversely of the length of car 15, from the plane of the axes of rotation of the group of inner rollers, 108 (said group including the rollers 211 through 220) to the plane of the axes of rotation of the group of outer rollers 106, (said group comprising the rollers 260 through 269) during vertical upward movement of the subassembly 22. The same relation of the axes of rotation of the group of inner rollers 109 and outer rollers 107 on subassembly 23 and vertical slots in the vertical tracks of the left vertical track subassembly 23 and the openings in the upper transverse tracks of subassembly 27 are provided as above discussed for the series of rollers 106 and 108 on subassembly 22, and the tracks of subassemblies 24 and 26. This provides for smooth transfer of the subassembly 23 into the tracks of subassembly 27 on upward movement of the subassembly 23 along the tracks of subassembly 25. In their raised position the subassemblies 22 and 23 are, respectively supported on the tracks of the subassembly 27 by the inner rollers 108 and 109.

The outer lip 246 of each of the vertical tracks as 46 continues upward above the height of the bottom opening 252 of the adjacent transverse track, as 70, to insure guidance of the inner set of rollers as 108 into a slot 286 by the outer set of rollers 106. Slot 286 is widened at its opening to facilitate such entry.

Above the level of the bottom and downwardly facing opening 252 of the track 70 the inner lip 244 of the track 46 curves centrally while outer lip 246 extends vertically and the slot 248 widens. The inner edge of lip 244 curves centrally with the same transverse width until its longitudinal projection intersects the vertical projection of the outer edge of the inner lip of the slot 286 at opening 252 and slot 248 correspondingly widens. This facilitates entry of the outer roller thereinto on downward and outward movement of panel 30 from tracks 70 and 90 to tracks 46 and 48. The slot 286 also widens laterally near opening 252 to the full width of member 284. Accordingly, the upward motion of subassembly 22 smoothly moves roller 211 into track 70 and downward and lateral motion of roller 219 in track 70 brings roller 263 into the upper opening 250 of track 46.

This relationship provides the following: on release of the ends of the assembly 150 by pulling on control cord 159 which attaches to arm 152 when downward movement of the subassembly 22 is desired from latches 72 and 92 and pulling outward and downward on handle 143, outward motion of the subassembly 22 from its upper position (supported on track 70) is begun. Then the front members 268, 266, 264, 262 and 260 of the outer set of rollers 106 freely enter opening 250 in track 46 and the rollers 269, 267, 265, 263 and 261 similarly smoothly enter the opening therefor at the top of track 48. The relationship of tracks 90 and 48 and 71 and 47 is the same as that for 70 and 46 above discussed.

The track 70 extends to a closed end 288 which is sufficiently far from the open end 252 to accommodate the entire length of the subassembly 22, i.e., from the top edge 181 of panel 36 to the bottom edge 112 of lowest panel 30. A right front cable 80 extends centrally from a fixed end 295 to central sheave 76 then around lateral sheave 78, which is pivotally attached by a U-shaped holder to the front of a horizontal entrance frame member 58 (which bounds the upper edge of entrance 42 and is firmly attached to members 52 and 54) down to the outer surface of bottom edge 112 of panel 30. Right rear cable 100 extends from a fixed end to central sheave 96, thence to and around a lateral sheave attached to the rear of member 58 and is fixed to the bottom of the outer rear surface of panel 30. A track 71 extends to a closed end 289 which is sufficiently far from the open end thereof to accommodate the entire length of the subassembly 23, i.e., from the top edge 181' of panel 37 to the bottom edge of panel 31. The left front cable 81 extends centrally from its fixed end 296 to its central sheave 77 thence to the lateral sheave 79 which is pivotally attached by a U-shaped holder therefor to a horizontal door frame member 59 which bounds the upper edge of entrance 43, and continues from said sheave to the outer surface of the bottom of the lowest panel 31 whereat it is fixed. The springs 74 and 94 support at least the bulk of the weight of subassembly 22 and permit it to be readily raised from its lowered position yet have a sufficiently low tension to permit it to be lowered conveniently. The spring 75 and the corresponding spring in the rear of subassembly 27 bear similar relation to subassembly 23. The tension of springs 74 and 94 and corresponding springs on subassembly 27 are adjusted by adjusting the spacing of their fixed ends from the frame of the car 15.

The upper left front horizontal track 71 is spaced below the right front horizontal track 70 sufficiently to allow the rollers projecting from the external surface of subassembly 23 to clear the lower surface of the subassembly 22 when both subassemblies 22 and 23 are in their respective upper horizontal tracks as 70 and 71. This clearance also provides that the rollers projecting from the external surface of the subassembly 22 will not interfere with the frame of the car 15. In the upper position of the subassembly 22 end 164 of bar 154 enters the hole 290 in the front upper safety latch 72 on front upper track 70 while the rear end of the latch arm 155 enters a hole therefor corresponding to 290, in the safety latch 92 attached to the track 90. In the upper position of the subassembly 23 the latching bar ends enter hole therefor in a latch as 73 on the front upper track 71 and a similar latch on the gear upper track of subassembly 63.

Release of trap door 120 releases grain from the car 15. Removal of the grain releases pressure forcing each movable door subassembly as 22 against the door frame members, as 52 and 54. Release of subassembly 150 from holes 166 and 167 permits a slight pull and springs as 74 and 94 to raise each door subassembly as 22. The use of two longitudinally spaced apart sets of rollers as 106 and 107 on separate lower vertical and upper transverse tracks therefor on each subassembly as 22 permits panels of each subassembly to be located in place or folded near ceiling with a minimum of interference with headroom space and facilitates use of the car for transport of other commodities than grain.

The apparatus 22 and 23 do not interfere with use of conventional railroad doors as sliding side doors as 292 and 293. While the apparatus is described in relation to a freight car, it may also be used for trailer and trucks to permit such to conveniently, efficiently, and economically load, haul and empty granular material in a covered vehicle and readily convert said vehicle to carry other commodities with a minimum of head space loss and a minimum of interference with the work and cargo space and capacity in such vehicles. In a particular embodiment of apparatus 14 in a railroad freight car 15, 9' 4" wide, 50' 6" long, 10' 6" high, the springs 54 and 94 are each 32" long and 2" wide; the sheaves as 96 and 98 are 3½" in outer diameter; cables 80 and 81 are ⅛" steel braided cable; panels 32 through 37 are all ¼" thick aluminum 20" high and 181" wide for double door use when openings as 42 are each 173" wide and 114" high (and 102" wide for 100,000 lbs. capacity grain cars with 94" doors and 80" wide for 80,000 lbs. capacity grain cars with 72" doors); panels 30 and 31 are 22" high and otherwise the same as panels 32 through 37; rollers 211 through 220 are 1½" diameter; panel 87 is 4" high; panel 86 is 8" high. Lateral opening 252 of track 70 is 12" below the bottom lip 280 where horizontal and 9' 0" above floor 19 and 2" below the vertical level of opening 250. The lateral downward opening of track 71 is 12" below its lower lip where horizontal and 8' 6" above floor 19 and 2" below the upper opening and end of track 47. Tracks 46 and 48 extend 110" above floor 19; track 47 to 104" above floor 19. The vertical tracks as 46 and 48 may be flush with the inner edges of the door frame elements as 52 and 54 framing opening 42 and are fastened thereto. An inwardly sloped channelled sill 297 is firmly attached to floor 19 and to members 52 and 54. The vertical frame members 52 and 54 each have smooth flat vertical inner surfaces 277 and 278 each 3½" wide which form a grain tight seal with the flat panel portions 227 and 228. The longitudinal upwardly open channel 279 in sill 297 is ⅜" wide and 1" deep and receives edge 112 and reinforces panel 30 as well as aids in sealing that edge. A similar sill 298 is provided in entrance 43 for panel 31. The tips of bar ends as 164 are conical and the holes 166 and 190 are correspondingly conical to provide a tight spring loaded fit therebetween.

As shown in FIGURE 5 each upper transverse track member as 70 comprises a central horizontal portion and a lateral downwardly curved portion firmly joined together. The downwardly curved portion extends to below the upper end 250 of the vertical member 46 and well above the upper edge 181 thereof in its lower vertical position. Each lower vertical track extends vertically from the floor of the car upward to above lower end 252 of the track 70 and terminates lower than the bottom edge of the horizontal portion thereof. Also, as shown in FIGURE 5 each said vertical track as 46 and each transverse track member neighboring thereto as 70 is longitudinally separated by the inner surface, as 277 of the vertical frame member, as 52, supporting that vertical track (as 46). FIGURE 5 shows, at 299 and 300, the extension of a flat vertical plane which includes the axes of rotation of the inner rollers as 211 and 212, 213 and 214, of set 108 intersecting the downwardly directed openings of the upper tracks 70 and 71 at the lateral end of their downwardly curved portions. This vertical plane is parallel to but spaced inwardly away from the flat vertical plane which intersects the slots as 248 in each of the vertical tracks as 46 by the same distance (measured transversely of the length of car 15) as the axes of rotation of the inner rollers, as 108, are spaced away from the axes of rotation of the outer rollers as 106 for assembly 22.

Although in accordance with the provision of the patent statutes, particular preferred embodiments of this invention have been described and the principles of the invention have been described in the best mode in which it is now contemplated applying such principles, it will be understood that the operations, constructions and compositions shown and described are merely illustrative and that my invention is not limited thereto and, accordingly, alterations and modifications which readily suggest themselves to persons skilled in the art without departing from the true spirit of the disclosure hereinabove are intended to be included in the scope of the annexed claims.

I claim:

1. A pair of grain door assemblies for permanent attachment in a freight car, said car comprising a longitudinally extending right vertical side wall, a longitudinally extending left vertical side wall opposite and parallel thereto, a ceiling affixed to the top of the right and left walls and a horizontal floor firmly affixed at the bottoms of said right and left walls, an opening in each of said vertical side walls, a frame outlining each said opening, each said frame comprising a rigid front vertical member and a rigid rear vertical member, said frame members extending to the floor of said car and firmly affixed thereto, each of said grain door assemblies comprising a movable door subassembly, a vertically extending track subassembly for holding said door subassembly in a vertical lowered position and a transversely extending track subassembly for holding said door subassembly in an elevated horizontal position, said movable door subassembly comprising a series of hingedly connected together horizontally extending rigid panels each said panel extending longitudinally in the length of one of said side walls, a pair of front and rear outer rollers supported on and rotatably attached to the front and rear end of each said panels, said rollers each being rotatable about the same longitudinally extending axis, each front and rear outer roller rotating in a zone exterior to the exterior surface of the panel to which attached and each said front and rear roller being longitudinally spaced inward from the front and rear end respectively of said panel, a pair of supports at each end of each said panels and firmly attached to the inner surface thereof, one said support at the front end, the other at the rear end of each said panel, each of a pair of front and rear inner rollers rotatable about a common axis extending longitudinally of said panel and rotatably supported in each of said supports, each of said front and rear inner rollers rotating in a zone extending beyond the front and rear edges respectively of said panels, said panels each respectively extending forward of the forward edge of the forward frame member of the door opening and rearward of the rear frame member of the door opening and forming a grain tight sealing contact between the outer surface of each said panel and the inner surface of each said frame member;

said vertically extending track subassembly comprising a vertically extending track attached to and supported by the front frame member of said wall opening and a vertically extending track attached to and supported by the rear frame member of said wall opening, said outer rollers of said movable door subassembly each fitting loosely in said vertically extending tracks in the lowered position of said movable door, said track members being supported at the same height and being mirror images of each other and located with the same relations to the transversely extending tracks;

said transversely extending track subassembly comprising a pair of transversely extending generally horizontal and parallel transverse front and rear tracks each supported adjacent to the ceiling of the car above the level of the top said movable door subassembly when said door subassembly is in its lowered vertical position, said tracks for said movable door subassembly being spaced apart the same distance as the rollers on the inner surface of the said movable door subassembly and in the same transverse plane as the plane of rotation of the inner rollers thereof, each said pair of transversely extending tracks comprising a front member and a rear member, said members being supported at the same height and being mirror images of each other and located with the same relations to the vertically extending tracks of said movable door subassembly, each said upper transverse track member comprising a central horizontal portion and a lateral downwardly curved portion firmly joined together, the downwardly curved portion of each of said upper transverse tracks each extending to below the upper end of the vertical member, each said vertically extending tracks of said grain door assembly extending from the floor of the car upward to above the lower ends of the transverse tracks of said grain door assembly but terminating lower than the upper end thereof; each said vertical track and each said transverse track members neighboring thereto being longitudinally separated by the width of the inner surface of said vertical frame member.

2. Apparatus as in claim 1 wherein each vertical track in its vertical portion is C-shaped in transverse horizontal section and has a vertical slot opening towards each other, and a first vertical flat plane parallel to the length of the car passes through said slots and the outer roller and each said transversely extending track is C-shaped in transverse vertical section in its horizontal portion with the slots open towards each other and the lateral end of each transverse track has a downwardly facing opening and said opening lies in a second vertical plane parallel to said first vertical flat plane and wherein lies the axes of rotation of the inner rollers on said panels of said movable door subassembly and said second transverse plane is transversely spaced away inwardly of said car walls from said first vertical plane by a distance which is the same as the transverse distance between the axes of rotation of said inner rollers and the axes of rotation of said outer rollers on said movable door subassembly when said movable door subassembly is in a vertically extended position with its bottom adjacent to the floor of said car.

3. Apparatus as in claim 1 wherein the bottom panel of each said series of panels comprises a frame with top, bottom, front and rear edge panels fixedly joined together and a central panel hingedly attached at its top to the bottom of the top edge panel for rotation outwards thereof, flexible sealing members joined to the interior surface of said top, bottom, front, and rear edge panels of the said bottom panel and respectively extending below the bottom edge of the top edge panel, above the top edge of the bottom edge panel, forward of the front edge of the rear edge panel, and rearwardly of the rear edge of the front edge panel, latching means supported on and firmly attached to the front surface of said movable panel, said latching means being movable to and from a position for engaging and disengaging from a latch holding member attached to the frame of said bottom panel, said sealing members in the closed position of said central panel forming a seal between said frame and said central panel.

4. Apparatus as in claim 3 wherein the transversely extending track subassembly for the movable door subassembly for and in the opening in one side wall of said car is at a level higher than the transversely extending track subassembly for the other side of said pair, said first track subassembly extending over the other and comprises a vertically extending space between the transversely extending tracks of said track subassemblies which accommodates the rollers extending externally of the outer surface of the movable door subassembly supported on the lower of said transversely extending track subassemblies.

5. Apparatus as in claim 3 wherein a panel in said movable door subassembly has a spring loaded latching means movable to and from latching position and urged into locking position by springs, latch holding means on each of said vertical extending track matching said latching means, whereby said door subassembly is held in latched position by said latching means and said means on said vertically extending tracks in the vertical lowered position of said movable door subassembly, and wherein said upper horizontal parallel tracks have attached thereto at the top surface thereof a safety latch comprising a holding means firmly attached to each said track and a hole therein extending upwardly over the top of each of said tracks, said hole opening towards a space between said tracks whereby said latching means on said panel in their expanded, locking position engage said hole in said safety latch means.

6. Apparatus as in claim 5 wherein, for each said movable door subassembly, a spring member is attached to a portion of the car frame transversely spaced away from the said movable door sub-assembly and at the level of the transversely extending track subassembly therefor, a cable is attached to a portion of said door frame above said movable door subassembly and said cable is attached to said spring and to said door subassembly and supports the weight thereof.

7. A grain door assembly comprising a movable door subassembly, a vertically extending track subassembly for holding said door subassembly in a vertical lowered position and a transversely extending track subassembly for holding said door subassembly in an elevated horizontal position; said movable door subassembly comprising a series of hingedly connected together horizontally extending rigid panels, a pair of front and rear outer rollers supported on and rotatably attached to the front and rear end of each said panels, said rollers each being rotatable about the same longitudinally extending axis, each front and rear outer roller rotating in a zone exterior to the exterior surface of the panel to which attached and each said front and rear roller being longitudinally spaced inward from the front and rear end respectively of said panel, a pair of front and rear inner rollers rotatable about a common axis extending longitudinally of said panel and rotatably supported on each of said panels, each of said front and rear inner rollers rotating in a zone extending beyond the front and rear edges respectively of said panels, said panels each respectively extending forward of the forward edge of a forward frame member of a door opening and rearward of a rear frame member of that door opening and forming a grain tight sealing contact between the outer surface of each said panel and the inner surface of each said frame member; said vertically extending track subassembly comprising a vertically extending track attached to and supported by the front frame member of said wall opening and a vertically extending track attached to and supported by the rear frame member of said wall opening, said outer rollers of said movable door subassembly each fitting loosely in said vertical extending tracks in the lowered position of said movable door, said transversely extending track subassembly comprising a pair of transversely extending generally horizontal and parallel transverse front and rear tracks each supported adjacent to the ceiling of the car above the level of the top of said movable door subassembly when said door subassembly is in its lowered vertical position, said tracks being spaced apart the same distance as the rollers on the inner surface of the said movable door subassembly and in the same transverse plane as the plane of rotation of the inner rollers thereof.

References Cited by the Examiner
UNITED STATES PATENTS

| | | |
|---|---|---|
| 1,336,068 | 4/1920 | Chesebro. |
| 1,461,839 | 7/1923 | Tenneson. |
| 1,630,680 | 5/1927 | Twedt et al. _____ 160—201 |
| 2,966,212 | 12/1960 | Fimbel _____ 160—189 X |
| 3,079,987 | 3/1963 | Klein _____ 160—193 X |

HARRISON R. MOSELEY, *Primary Examiner.*

D. L. TAYLOR, *Assistant Examiner.*